United States Patent
Lan et al.

[11] Patent Number: 5,924,878
[45] Date of Patent: Jul. 20, 1999

[54] PROTECTION DEVICE FOR EXPANSION DEVICE OF PORTABLE COMPUTER

[75] Inventors: Chuan-Chi Lan; Chung-Kuo Lai, both of Taipei, Taiwan

[73] Assignee: Compal Electronics, Inc., Taipei, Taiwan

[21] Appl. No.: 09/042,510

[22] Filed: Mar. 17, 1998

[51] Int. Cl.⁶ .................................................. H01R 13/44
[52] U.S. Cl. .......................................... 439/136; 361/686
[58] Field of Search ........................... 439/136; 361/686, 361/754, 740

[56] References Cited

U.S. PATENT DOCUMENTS

| | | | |
|---|---|---|---|
| 5,050,211 | 9/1991 | Dortu et al. ............................ | 379/438 |
| 5,199,888 | 4/1993 | Condra et al. ......................... | 439/142 |
| 5,331,506 | 7/1994 | Nakajima ............................... | 361/683 |
| 5,724,226 | 3/1998 | Ruch et al. ............................. | 361/683 |
| 5,870,283 | 2/1999 | Maeda et al. .......................... | 361/686 |

*Primary Examiner*—Steven L. Stephan
*Assistant Examiner*—Hae Moon Hyeon
*Attorney, Agent, or Firm*—Bacon & Thomas, PLLC

[57] ABSTRACT

A protection device is disposed between the socket entrance of the expansion socket of the expansion device and the casing of a portable computer. The casing is formed with a window corresponding to the socket entrance. In an unprotected state, the expansion device functions in a normal manner. However, in a protected state, the protection device shields the socket entrance of the expansion socket and prevents an external article from being inserted into or withdrawn from the expansion socket.

12 Claims, 3 Drawing Sheets

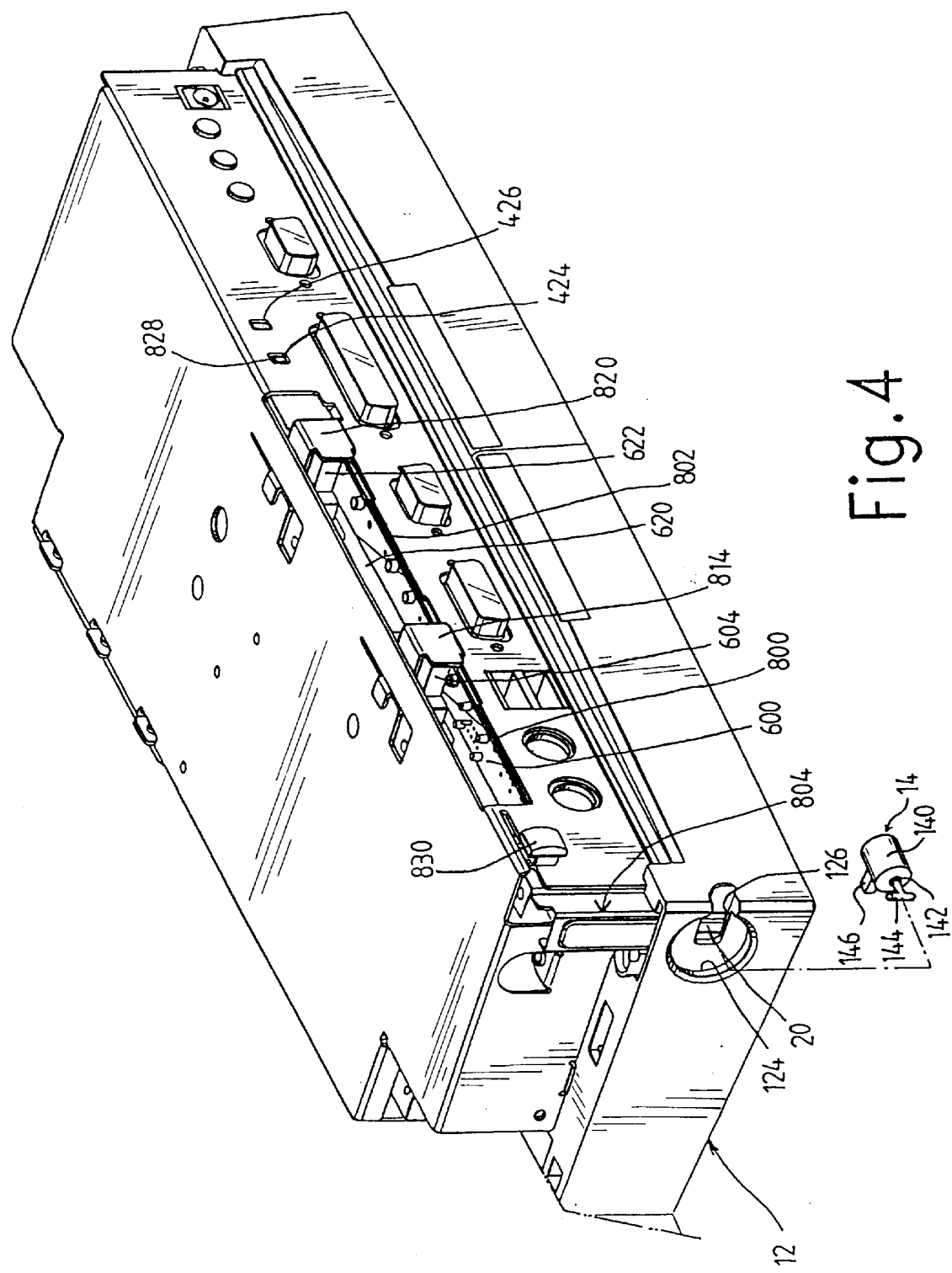

PROTECTION DEVICE FOR EXPANSION DEVICE OF PORTABLE COMPUTER

BACKGROUND OF THE INVENTION

The present invention relates to a protection device for expansion device of portable computer, which is able to shield the expansion socket of the expansion device and prevent the expansion socket from being improperly used.

A portable computer is advantageous over an on-desk computer in that the portable computer can be freely carried with the user. In order to achieve this object, the portable computer has minimized volume, thin thickness and light weight. However, due to limitation of space, the portable computer fails to have some of the functions of the on-desk computer, especially the expansion function.

In order to overcome the problem of insufficiency of expansion function, some manufacturers have developed an externally connected expansion device for the portable computer, such as docking or replicator which has at least one expansion socket. However, the expansion socket of the existing docking or replicator is not equipped with any protection device which is able to prevent the expansion card in the expansion socket from being taken away and protect the expansion socket from being improperly used.

SUMMARY OF THE INVENTION

It is a primary object of the present invention to provide a protection device for expansion device of portable computer, which is able to prevent the expansion card in the expansion socket from being taken away and protect the expansion socket from being improperly used.

According to the above object, the protection device of the present invention includes a casing in which a circuit board is mounted. The circuit board is disposed with a first expansion socket. The casing is formed with a window facing and corresponding to a socket entrance of the first expansion socket. A support assembly is disposed on a periphery of the window. The protection device is disposed in the support assembly and slidable between the socket entrance and the window. The protection device includes a first long connecting member having a first and a second ends. The first end is fixedly connected with a restriction member for restricting the protection device from sliding. The second end is fixedly connected with a first stopper member. The distance between the first stopper member and the restriction member being slightly larger than the width of the socket entrance of the first expansion socket, whereby when the protection device is slided to move the first stopper member toward the socket entrance and shield a part of the socket entrance, the restriction member fixes and prevents the protection device from further sliding so as to protect the first expansion socket from being improperly used.

The present invention can be best understood through the following description and accompanying drawings, wherein:

BRIEF DESCRIPTION OF THE DRAWINGS

FIG. 4 is a perspective assembled view of the upper casing, circuit board, protection device, lower casing and base seat in FIG. 1, wherein the protuberance of the locating member of the protection device is leftward shifted from the second locating hole of the upper casing to the first locating hole.

DETAILED DESCRIPTION OF THE PREFERRED EMBODIMENTS

Figure 1:
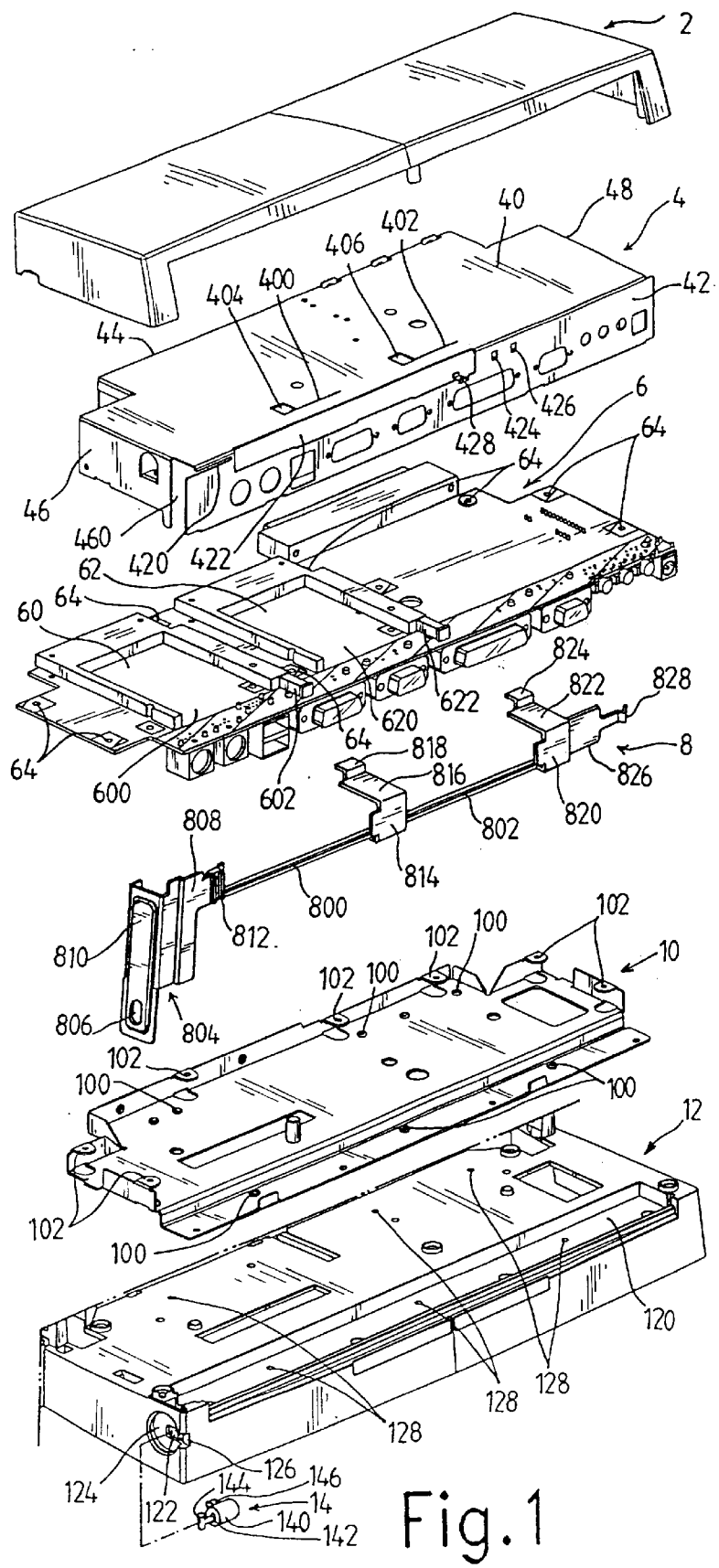
FIG. 1 is a perspective exploded view of the protection device of the present invention applied to a portable computer.

Please refer to FIG. 1. The present invention includes an upper cover 2, an upper casing 4, a circuit board 6, a protection device 8, a lower casing 10, a base seat 12 and a lock device 14. The upper casing 4 includes a top board 40, a front and a rear face boards 42, 44 and a left and a right side boards 46, 48. The left side board 46 is formed with an installation port 460 at front end. The upper end of the front face board 42 is disposed from left side to right side a slide slot 420, a rectangular window 422, a first locating hole 424 and a second locating hole 426. The left end of the slide slot 420 leftward extends to intersect the installation port 460 of the left side board 46 to form an opening. The right lower end of the window 422 is disposed with an inward extending support 428. The front end of the top board 40 is side-by-side disposed with a first and a second slide slits 400, 402 corresponding to the window 422. The left ends of the slide slits 400, 402 have rearward extending guide ports 404, 406.

The circuit board 6 is side-by-side disposed with a first and a second expansion sockets 60, 62. The front end of each expansion socket 60, 62 includes a socket entrance 600, 620 and an ejection button 602, 622. In addition, the circuit board 6 is formed with multiple support holes 64.

The protection device 8 includes a first and a second long levers 800, 802 interconnected with each other. The left end of the first long lever 800 is connected with a restriction section 804 including a lock hole 806 for locking the lock device 14. In a preferred embodiment, the restriction section 804 is made of a panel body 808 bent with an engaging face 810 facing the axis of the long levers 800, 802. The lock hole 806 is formed on the engaging face 810. The upper end of the panel body 808 adjacent to the left end of the first long lever 800 is disposed with a driving member 812 perpendicular to the panel body 808. In addition, an upward extending first stopper board 814 is disposed at the adjoining section of the first and second long levers 800, 802. The top end of the first stopper board 814 is disposed with a first extension board 816 extending rearward. The free end of the first extension board 816 has an upward extending first projection plate 818. Similarly, the right end of the second long lever 802 has an upward extending second stopper board 820. The top end of the second stopper board 820 is disposed with a second extension board 822 extending rearward. The free end of the second extension board 822 has an upward extending second projection plate 824. A resilient locating member 826 from right side to left side connects with the right end of the second long lever 802. The locating member 826 has a protuberance 828.

The lower casing 10 includes a first and a second sets of support holes 100, 102. The base seat 12 has a hollow bottom. The front end of the top section of the base seat 12 is disposed with a recess 120. The front end of the left side wall of the base seat 12 is disposed with a support socket 124 having a central through hole 122 passing from outer side of the base seat 12 to the hollow bottom of the base seat 12. The support socket 124 on front side has a locating notch 126. In addition, the base seat 12 is formed with multiple support holes 128.

The lock device 14 includes a lock head 140 and a lock core 142 disposed at the axis of the lock head. The lock core 142 protrudes out of the lock head 140. The lock core has an outward extending long lock lever 144.

A projecting block 146 is disposed on the periphery of the lock head 140.

When assembled, the locating member 826 of the protection device 8 is placed into the bottom of the upper casing 4 with the restriction section 804 of the protection device 8 aligned with the installation port 460 of the upper casing 4. Then the driving member 812 is placed into the slide slot 420 with the first and second projecting plates 818, 824 respectively aligned with the guide ports 404, 406. Then the projecting plates 818, 824 are respectively upward passed through the guide ports 404, 406 and slided into the first and second guide slits 400, 402. (In the case that the width of the slide slits 400, 402 is larger than the thickness of the first and second projecting plates 818, 824, without the guide ports 404, 406, the projecting plates 818, 824 can be directly passed outward and slided from left side to right side into the first and second slide slits 400, 402.) Then, the bottom end of the locating member 826 is bridged over the support 428 with the protuberance 828 fitted into the first or the second locating hole 424, 426. Then the support holes 64 of the circuit board 6 are aligned with the second set of support holes 102 of the lower casing 10 and tightened by bolts. Then the first set of support holes 100 of the lower casing 10 are aligned with the support holes 128 of the base seat 12 and tightened by bolts. Finally, the assembly is covered by the upper cover 2.

The supporting and connection of the upper cover 2, upper casing 4, circuit board 6, lower casing 10 and base seat 12 are achieved by general measures such as screws, tight fit, etc. In the case that the circuit board 6 is formed with support holes corresponding to the support holes 128 of the base seat 12, the circuit board 6 can be directly supported on the base seat 12 without the lower casing 10. That is, the lower casing 10 can be omitted. Moreover, in the case of existence of the lower casing 10 and the upper and lower casings 4, 10 meet the requirement of beautiful appearance, the upper cover 2 and the base seat 12 can be omitted.

Figure 2:
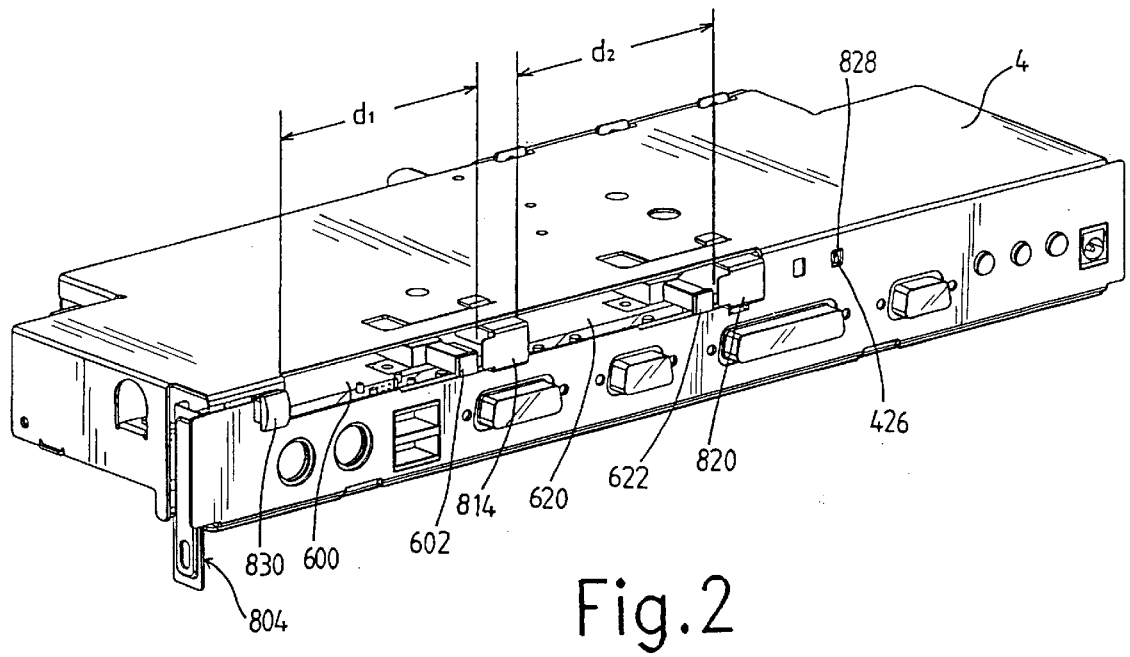
FIG. 2 is a perspective assembled view of the upper casing, cicuit board and protection device in FIG. 1.

In operation, referring to FIG. 2, the driving member of the protection device is fitted in a driving member housing 830 with the protuberance 828 fitted in the second locating hole 426 of the upper casing 4. At this time, the distance d1 between the first stopper board 814 of the protection device and the restriction section 804 is slightly larger than the total width of the socket entrance 600 of the first expansion socket and the ejection button 602. Similarly, the distance d2 between the first and second stopper boards 814, 820 of the protection device is slightly larger than the total width of the socket entrance 620 of the second expansion socket and the ejection button 622. Therefore, a user can use the first and second expansion sockets without obstacles.

Figure 3:
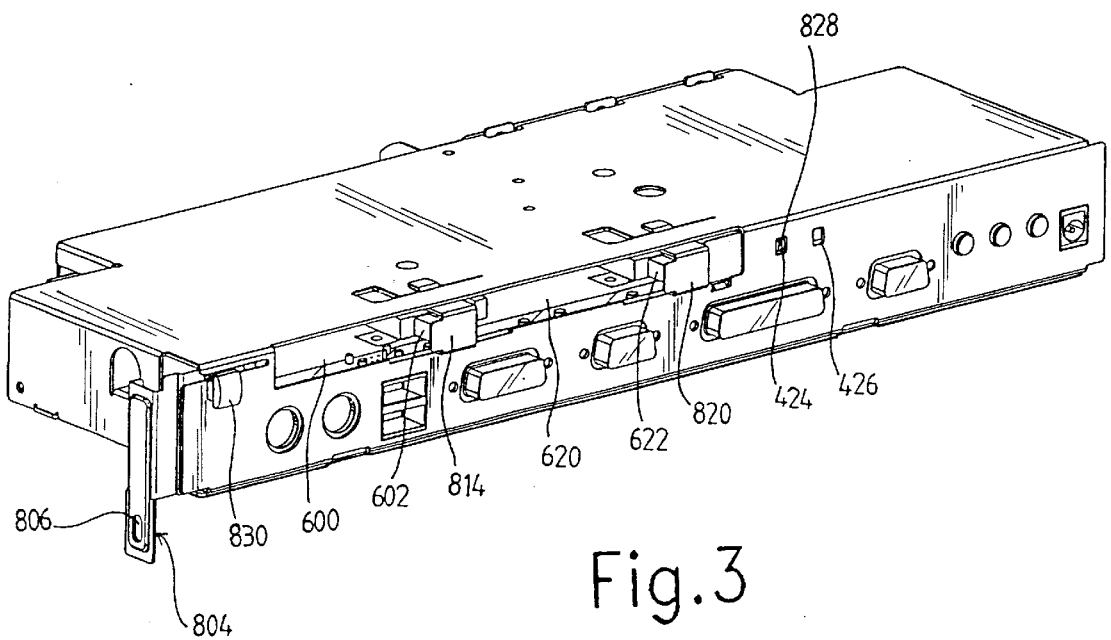
FIG. 3 is a view according to FIG. 2, wherein the protuberance of the locating member of the protection device is leftward shifted from the second locating hole of the upper casing to the first locating hole.

In FIG. 3, the protuberance 828 of the locating member is leftward shifted from the second locating hole 426 to the first locating hole 424. At this time, the first and second stopper boards 814, 820 are both leftward shifted to respectively shield the ejection buttons 602, 622 of the first and second expansion sockets and a part of the socket entrances 600, 620. Therefore, the user cannot further use the first and second expansion sockets to achieve a protective effect. In addition, in FIG. 3, the lock hole 806 of the restriction section 804 of the protection device is also leftward shifted by a certain distance which is equal to the distance between the first and second locating holes 424, 426.

It should be noted that the driving member 812 and the slide slot 420, the first projecting plate 818 and the first slide slit 400, the second projecting plate 824 and the second slide slit 402 and the protection device 8 and the support 428 are mounted in such a manner that the protection device 8 can be freely slided between the expansion socket entrances 600, 620 and the window 422 of the upper casing. The mounting structure can be easily substituted by other measures. For example, a slide frame or slide rail (not shown) can be disposed around the window 422 of the upper casing for the protection device 8 to slide therewithin. Under such circumstance, the protection device 8 can be free from the projecting plates 818, 824 and the extension boards 816, 822. Also, the upper casing 4 can be free from the support 428.

FIG. 4 shows the assembly of the upper casing, circuit board, protection device, lower casing and the base seat. As shown in FIG. 3, the protuberance 828 of the locating member is leftward shifted from the second locating hole 426 to the first locating hole 424. At this time, along with the protection device, the lock hole (denoted as 806 in FIG. 1) of the restriction section passes from right side to left side through the recess (denoted as 120 in FIG. 1) of the base seat 12 to get near and aligned with the central through hole (denoted as 122 in FIG. 1) of the left inner wall of the base seat 12 to form an elongated passage 20. At this time, the user can extend the long lock lever 144 of the lock device 14 from the outer side of the base seat 12 into the elongated passage 20 until the lock head 140 is fitted into the support socket 124 of the base seat 12 and the projecting block 146 of the lock head is fitted into the locating notch 126. Then a key (not shown) is inserted into the lock core 142 to rotate and disalign the long lock lever 144 from the elongated passage 20 so as to achieve a locking effect. Under such circumstance, the protection device is prevented from sliding.

In a modified embodiment of the present invention, the base seat 12 is removed. The length of the upper casing 4 is leftward extended by about the distance between the two locating holes 424, 426. In addition, the front end of the left side board 46 of the upper casing is disposed with a support socket 124 and a locating notch 126 which are originally disposed on the base seat 12. Accordingly, the same locking effect can be also achieved to prevent the protection device from sliding. The support socket 124 and the locating notch 126 are not necessary to be formed on the installation port 460 of the upper casing 4. Alternatively, they can be formed on the left side board 46 beside the installation port 460. Therefore, the lock hole 806 of the restriction section can be aligned with the through hole 122 to achieve the same locking effect. Accordingly, the first and second stopper boards 814, 820 of the protection device can respectively shield the ejection buttons 602, 622 of the first and second expansion sockets and a part of the socket entrances 600, 620. Under such circumstance, the user cannot use the first and second expansion sockets to achieve a protective effect. The above lock device 14 can be modified into a U-shaped lock device (not shown). Under such circumstance, the left side wall of the base seat 12 or the left side board 46 of the casing can be formed with two holes (not shown) aligned with the lock hole 806 of the protection device and the U-shaped lever of the U-shaped lock device can be passed into one of the holes through the lock hole 806 of the protection device and then through the other hole. Accordingly, the same locking effect can be also achieved.

The above protection device 8 is designed in accordance with the circuit board 6 with two expansion sockets. In the case that the circuit board 6 has only one expansion socket, the protection device 8 can be modified by removing the second long lever 802, the second stopper board 820, etc. corresponding to the second expansion socket.

It should be noted that the above description and accompanying drawings are only used to illustrate some embodiments of the present invention, not intended to limit the scope thereof. Any modification of the embodiments should fall within the scope of the present invention.

What is claimed is:

1. A protection device for the expansion assembly of a portable computer in which the assembly includes a circuit board disposed in a casing having a window facing an entrance of an expansion socket within the circuit board, the device comprising a support assembly for disposition on a periphery of the window, a connecting member disposed in the support assembly for sliding movement between the socket entrance and the window, the connecting member including a first end and a second end, a restriction member connected to the first end for restricting the sliding movement of the connecting member, a stopper member connected to the second end, the distance between the stopper member and the restriction member being greater than the width of the socket entrance, a locating member connected to the second end of the connecting member, wherein when the connecting member is slid to move the stopper member toward the socket entrance and shield a part of the socket entrance, the restriction member prevents the connecting member from further sliding movement in order to protect the expansion socket from improper use.

2. The protection device of claim 1 wherein the locating member is connected to the stopper member for sliding movement between two locating holes formed in the casing.

3. The protection device of claim 2 wherein the locating member includes a resilient plate provided with a protuberance.

4. The protection device of claim 1 wherein the support assembly includes a driving member extending from the connecting member for extending through a slide slot formed in the casing and disposed parallel to the sliding direction of the connecting member.

5. The protection device of claim 1 wherein the support assembly includes a slit disposed parallel to the sliding direction of the connecting member, the connecting member further including a projecting plate extending from a top section of the stopper member and slidably engaged within the slit.

6. The protection device of claim 1 wherein the support assembly includes a support for disposition on a lower edge of the window for supporting the connecting member.

7. The protection device of claim 1 wherein the support assembly includes a frame within which the connecting member is installed.

8. The protection device of claim 1 wherein the restriction device includes a lock hole.

9. The protection device of claim 8 further including a through hole formed in the casing and corresponding to the lock hole, the through hole extending to the outer face of the casing, a locating socket formed in the outer face of the casing, whereby when the connecting member is slid to dispose the stopper member toward the socket entrance to shield a portion thereof, the lock hole is disposed immediately adjacent to and aligned with the through hole to form an elongated passage.

10. The protection device of claim 8 wherein the lock hole extends to an outer side of the casing, the casing being disposed in a base seat, an outer side wall of the base seat being formed with a locating socket aligned with the lock hole, the locating socket including a central through hole passing from the outer side wall of the base seat to the inner side wall thereof, whereby when the connecting member is slid and the stopper member is moved toward the socket entrance to shield a part thereof, the lock hole is disposed adjacent to and aligned with the through hole to form an elongated passage.

11. The protection device of claim 9 further including a lock device having a lock head insertable in the locating socket and a lock core disposable at the axis of the lock head, the lock core protruding out of the lock head and having an outwardly extending lock lever corresponding to the elongated passage.

12. A protection device for the expansion assembly of a portable computer, wherein the assembly includes a circuit board disposed within a casing having a window, the circuit board having first and second expansion sockets and the window facing an entrance of each expansion socket, the device comprising a support assembly for disposition on a periphery of the window, a first connecting member and a second connecting member disposed in the support assembly for sliding movement between the first and second socket entrances and the window, each connecting member including a first end and a second end, a restriction member connected to the first end of the first connecting member for restricting the sliding movement of both connecting members, a first stopper member connected to the second end of the first connecting member and the first end of the second connecting member, a second stopper member connected to the second end of the second connecting member, the distance between the first and second stopper members being greater than the width of the second socket entrance, a locating member connected to the second end of the second connecting member, whereby when the first and second connecting members are slid, the first and second stopper members are moved toward the first and second socket entrances to shield respective parts thereof, and the restriction member secures and prevents the first and second connecting members from further sliding to protect the first and second expansion sockets from being improperly used.

* * * * *